US 6,658,388 B1

(12) United States Patent
Kleindienst et al.

(10) Patent No.: US 6,658,388 B1
(45) Date of Patent: *Dec. 2, 2003

(54) PERSONALITY GENERATOR FOR CONVERSATIONAL SYSTEMS

(75) Inventors: Jan Kleindienst, Kladno-Krochehlavy (CS); Ganesh N. Ramaswamy, Ossining, NY (US); Ponani Gopalakrishnan, Yorktown Heights, NY (US); Daniel M. Coffman, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,803

(22) Filed: Sep. 10, 1999

(51) Int. Cl.[7] .............................................. G10L 15/22
(52) U.S. Cl. ...................................... 704/275; 704/270
(58) Field of Search ................................ 704/270, 271, 704/272, 275, 277

(56) References Cited

U.S. PATENT DOCUMENTS 6,144,938 A * 11/2000 Surace et al. ............... 704/257
6,185,534 B1 * 2/2001 Breese et al. ............... 704/270
6,275,806 B1 * 8/2001 Pertrushin ................... 704/270

OTHER PUBLICATIONS

Papineni et al., "Free-Flow Dialog Management Using Forms," Eurospeech, Budapest, Hungary, Sep. 1999.

Lamel et al., "The LIMSI ARISE System for Train Travel Information," International Conference on Acoustics, Speech and Signal Processing, Phoenix, Arizona, Mar. 1999.

Ward et al., "Towards Speech Understanding Across Multiple Languages," International Conference on Spoken Language Processing, Sydney, Australia, Dec. 1998.

* cited by examiner

Primary Examiner—Richemond Dorvil
Assistant Examiner—Abul K. Azad
(74) Attorney, Agent, or Firm—F. Chau & Associates, LLC (57) ABSTRACT

A method for providing a personality for a conversational system includes providing a plurality of attributes for determining a behavior of the conversational system. When a command is presented to the conversational system for execution, the command is responded to by employing the plurality of attributes such that the user experiences an interface with human characteristics.

23 Claims, 6 Drawing Sheets

PERSONALITY GENERATOR FOR CONVERSATIONAL SYSTEMS

BACKGROUND OF THE INVENTION

1. Field of the Invention

The present invention relates to conversational systems, and more particularly to a method and system which provides personality, initiative and emotions for interacting with human users.

2. Description of the Related Art

Conversational systems exhibit a low level of initiative, typically provide no personality, and typically exhibit no emotions. These conventional systems may provide desired functionality, but lack the capability for human-like interaction. Even in the present computer oriented society of today many would-be computer users are intimidated by computer systems. Although conversational systems provide a more natural interaction with humans, human communication involves many different characteristics. For example, gestures, inflections, emotions, etc. are all employed in human communication.

Therefore, a need exists for a system and method for increasing a level of system initiative, defining and managing personality, and generating emotions for a computer system. A further need exists for a system which customizes and/or adapts initiative, emotions and personality responsive to human interactions.

SUMMARY OF THE INVENTION

A method, in accordance with the present invention, which may be implemented by a program storage device readable by machine, tangibly embodying a program of instructions executable by the machine to perform steps for providing a personality for a conversational system, includes providing a plurality of attributes for determining a behavior of the conversational system. When a command is presented to the conversational system for execution, the command is responded to by employing the plurality of attributes such that the user experiences an interface with human characteristics.

In alternate steps, the attributes may include a manner of presenting information to the user. The attributes may include at least one of language characteristics, grammar, speech models, vocabulary, emotions, sense of humor and learning ability. The attributes are preferably selectable by the user. The attributes may include user customized attributes, adaptable attributes based on interaction between the user and the conversational system, and/or application dependent attributes. The step of responding to the command by employing the plurality of attributes may include the step of adapting the attributes in accordance with user preferences. The personality may include emotions and the step of providing a plurality of attributes may include providing emotions associated with the personality attributes, each personality comprising a set of emotional levels for determining the behavior of the conversational system. The manner of presenting information to the user may include employing voices defined by specifying pitch, range, speaking rate and volume.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a method and system which includes an emotion, initiative and personality (EIP) generator for conversational systems. Emotions, such as frustration, happiness, loneliness and weariness, along with initiative taking, are generated and tracked quantitatively. Subject to the nature of interaction with the user, the emotions and initiative taking are dissipated or grown as appropriate. The frequency, content, and length of the response from the system are directly affected by the emotions and the initiative level. Desired parameters of the emotions and the initiative level may be combined to form a personality, and the system will adapt to the user over time, on the basis of the factors such as the accuracy of the understanding of the user's command, the frequency of the commands, the type of commands, and other user-defined requirements. The system/method of the present invention will now be illustratively described in greater detail.

It should be understood that the elements shown in FIGS. 1–6 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, the present invention provides a system personality 12 (or personalities) as a collection of attributes 14 which affect the system's conversational characteristics. A system 10 includes at an application 16 which includes the personality 12. The personality 12 determines how the system 10 behaves and presents itself. Using different personalities a user can still accomplish the same task. It is possible for the user to select a personality from a precompiled collection of personalities that suits his/her working habits, current state of mind, etc. The user can also create a new personality— either from scratch or by inheriting/extending/modifying an already existing personality. Personalities can be shared across applications, and even across access devices. When selecting the same personality across applications or devices, the user's immediate benefit is the feel of acquittance and familiarity with the system, regardless whether (s)he accesses the conversational system via desktop, telephone, personal digital assistant (PDA), etc.

Figure 1:
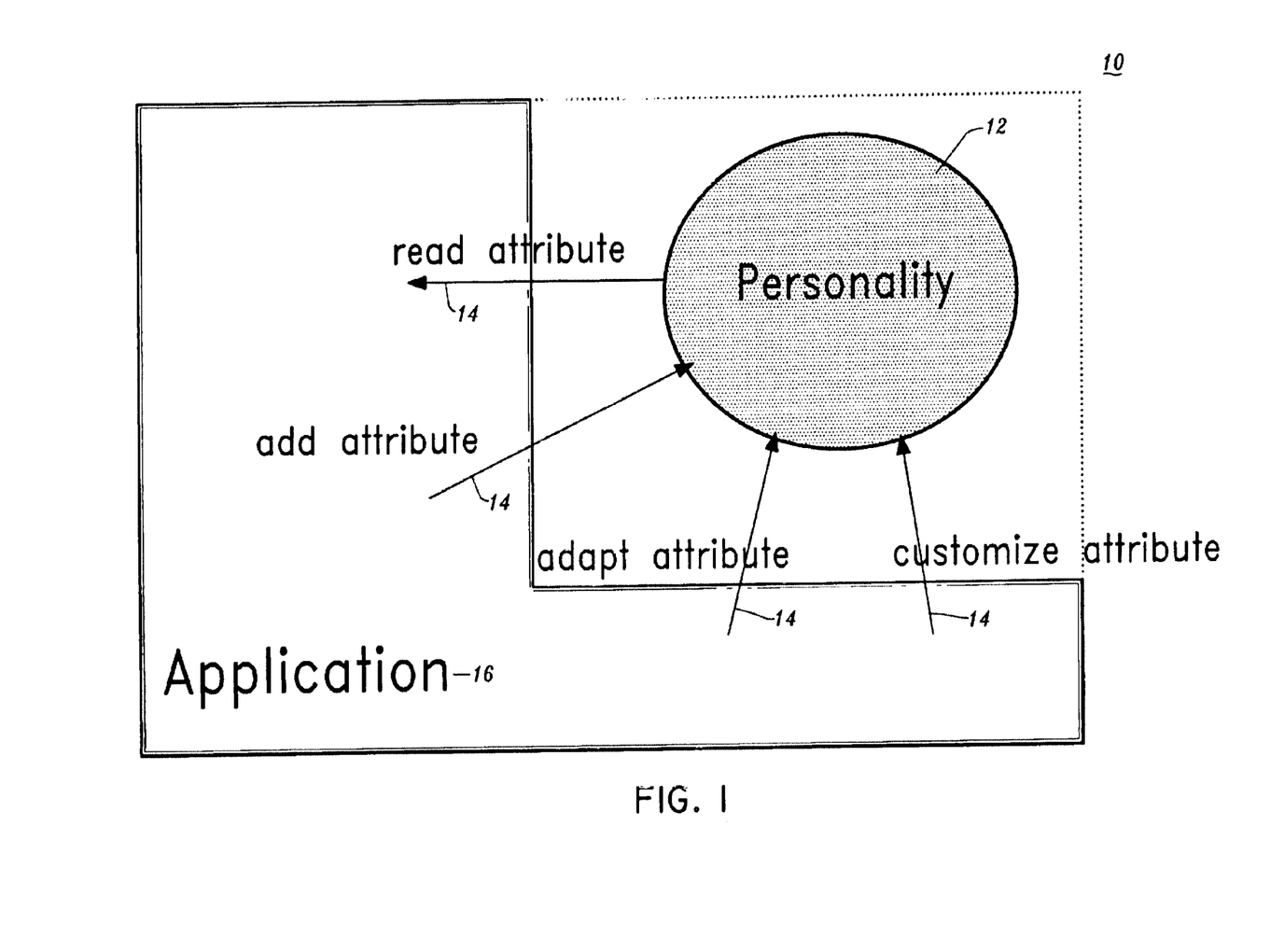
FIG. 1 is a schematic diagram showing a personality component incorporated into applications in accordance with the present invention.

The attributes 14 that comprise system personality may be divided into two classes:

Low-level

This class includes very distinctive, easy to capture by the user attributes. This class is straightforward to implement and easy to setup and affects only the way information is presented to the user. These attributes include text-to-speech characteristics of the system (speaking rate, speaking level, prosody, etc.), and the language and grammar of system prompts (short versus long, static versus dynamic, formal versus casual, etc.)

High-level

These attributes are more sophisticated, directly affecting the behavior of the system. The attributes include the language, vocabulary, and language model of the underlying speech recognition engine ("free speech" versus grammars, email/calendar task versus travel reservation, telephone versus desktop prototypes, etc.). Other attributes included in this class include the characteristics of the underlying natural language understanding (NLU) models (task/domain, number of supported commands, robustness models), preferred discourse behavior (selecting appropriate dialog forms or decision networks), conversation history of the session (both short-term and long-term memories may be needed), emotional models (specifying the mood of the personality), the amount of learning ability (how much the personality learns from user and the environment), and sense of humor (affects the way the personality processes and presents data).

Other attributes may be considered for each of theses classes. Other classification schemes are also contemplated. The enumeration of above attributes represents core attributes of personality which is assumed to be common across applications. Other attributes may come into play when the conversation is carried in the context of a specific application. For example, when the user is having a conversation with an email component, the email component may need the information describing how the mail should be summarized, e.g. how to determine urgent messages, what messages leave out of the summary, etc. This illustrates a need for application-specific classification of personality attributes, for example, application-dependent attributes, and application-independent attributes.

Some of the personality properties may be directly customized by the user. For example, the user may extend a list of messages that should be handled as urgent, or select different voices which the personality uses in the conversation with the user. These are examples of straightforward customization. Some personality attributes may also be modified only by reprogramming the system 10. There are also attributes that cannot be customized at all, such as a stack (or list) of conversation history. Based on this, three types of personality attributes include:

customizable by standard user customizable by trained user non-customizable.

It is not always needed for the user to customize the personality 12 explicitly. The personality 12 may also adapt some of its attributes during the course of the conversation based on the user's behavior. Some attributes cannot be adapted, such as the conversational history. Therefore personality attributes are either adaptable or non-adaptable.

System personalities are preferably specified by personality specification files. There may be one or more files for each personality. A convention for naming these human-readable files may be as follows. The file may include a personality_prefix, followed by the actual personality name, and end with a .properties extension. For example, the personality called "SpeedyGonzales", is specified in the property file personality_SpeedyGonzales.properties. The content of the file may illustratively appear as follows:

Personality File Example 1:

```
#Personality Type: Simple

#This file may be later converted to ListResourceBundle

#==============================================
#General settings
#==============================================
personality.name=SpeedyGonzales
personality.description=fast and erratic, low initiative
personality

#==============================================
#Emotions
#==============================================
emotion.grammar=speedygonzales.hsgf
emotion.scale.MIN=0.1
emotion.scale.LITTLE=0.15
emotion.scale.SLIGHTLY=0.2
emotion.scale.SOMEWHAT=0.25
emotion.scale.BUNCH=0.5
emotion.scale.MAX=0.8 emotion.loneliness.updatingfrequency=7
emotion.loneliness.initialvalue=0.25
emotion.loneliness.threshold=0.94
Emotion.loneliness.alpha=1 emotion.weariness.updatingfrequency=25
emotion.weariness.initialvalue=0.05
Emotion.weariness.threshold=0.9
emotion.weariness.alpha=1 emotion.happiness.updating frequency=20
emotion.happiness.initialvalue=0.1
Emotion.happiness.threshold=0.9
emotion.happiness.alpha=1 emotion.frustration,updatingfrequency=20
Emotion.frustration.initialvalue=0.05
emotion.frustration.threshold=0.9
emotion.frustration.alpha=1

#==============================================
    #Grammar for system prompts
#==============================================
prompts.grammar=speedygonzales.hsgf

#==============================================
#Robustness threshold settings
#==============================================
accepted.prob=0.9
rejected.prob=0.02
undecided.prob=0.08

#==============================================
#System initiative
#==============================================
initiative.level=0.9
``` initiative.options=speedygonzales.inopt

```
#================================================
#Voice properties
#================================================
``` pitch (male 70–140 Hz, female 140–280 Hz), range(male 40–80 Hz,
female>80 Hz),
speaking rate (standard 175 words per min), volume (0.0–1.0,
1.0,default 0.5)
voice.default=(140,80,250,0.5)
voice.default=ADULT MALE2

The personality file content of example 1 will now be described. The personality definition includes several sections listed in order as they appear in a typical personality file. The General Settings section, specifies the name of the personality and its concise description. The Emotion section, specifies resources needed for managing system emotions. Each personality may have different parameters that specify how the emotions of the system are to be grown, and different thresholds for initiating system actions based on emotions. As a result, different personalities will exhibit different emotional behavior. For example, some personalities may get frustrated very quickly, and others may be more tolerant.

The section on Grammar for system prompts defines the grammar that is used for generating speech prompts used for issuing system greetings, prompts, and confirmations. Different personalities may use different grammars for communicating with the user. In addition to the length and choice of vocabulary, different grammars may also differ in content.

The Robustness threshold setting section defines certain parameters used to accept or reject the translation of a user's input into a formal language statement that is suitable for execution. The purpose of robustness checking is to avoid the execution of a poorly translated user input that may result as in incorrect action being preformed by the system. If a user input does not pass the robustness checking, the corresponding command will not be executed by the system, and the user will be asked to rephrase the input. An example of how a robustness checker may be built is disclosed in commonly assigned, U.S. Patent Application Ser. No. 09/390,308, entitled "METHOD AND SYSTEM FOR ENSURING ROBUSTNESS IN NATURAL LANGUAGE UNDERSTANDING", incorporated herein by reference. Each personality may have a different set of robustness checking parameters, resulting in different levels of conservativeness by the system in interpreting the user input. These parameters may be adapted during use, based on how successful the user is in providing inputs that seem acceptable to the system. As the system learns the characteristics of the user inputs, these parameters may be modified to offer better performance.

The section on System initiative of example 1 defines the initiative level and options to be used by the system in taking initiative. Higher initiative levels indicate a more aggressive system personality, and lower levels indicate very limited initiative or no initiative at all. These initiatives may be event driven (such as announcing the arrival of new messages in the middle of a session), system state driven (such as announcing that there are several unattended open windows) or user preference driven (such as reminding the user about an upcoming appointment). Initiative levels may be modified or adapted during usage. For example, if the user is actively executing one transaction after another (which may result in high levels of "weariness" emotion), then system initiative level may be reduced to avoid interruption to the user.

The section Voice Properties specifies the voice of the personality. Several pre-compiled voices can be selected, such as FAST_ADULT_MALE, ADULT_FEMALE, etc., or the voice can be defined from scratch by specifying pitch, range, speaking rate, and volume.

The system 10 (FIG. 1) initializes with a default personality which has a name specified in a configuration file (personality 12). The user is allowed to change personalities during the conversational session. The selects a personality from a list of available personalities stored in a dedicated personality directory. When the user selects a new personality, the old personality says good bye, and the new one greets the user upon loading. The user hears something like this:

Old personality: This is your old personality HeavyDuty speaking. So you want me to die. I do not deserve this. To die will be an awfully big adventure.

Newly selected personality (in different voice and speed): Forget about HeavyDuty. My name is SpeedyGonzales and I'm gonna be your new personality till death do us part.

Note that both farewell message of the old personality and the greeting of the new personality are generated based upon a randomization grammar file specified in the Randomization Section of the respective personality file which was described above in example 1.

The user can define a new personality that suits his/her needs by creating a new personality file and placing the personality file into a proper directory where the system 8 looks for available personalties. By modifying a proper configuration file, the user can tell the system to use the new personality as a default startup personality.

To permit building on already existing personalities, the system 8 supports new personalities to be created by inheriting from the old ones. The new personality points to the personality from which it wishes to inherit, and then overwrite or extend the attributes set to define a new personality. The example of the creating a new personality by inheritance is shown in example 2:

Personality Inheritance, Example 2

```
#Personality Type: Simple

#================================================
#General settings
#================================================
``` extends SpeedyGonzales personality.name=VerySpeecyGonzales
personality.description=very fast and erratic, low initiative personality

```
#================================================
#Voice properties
#================================================
``` pitch(male 70–140 Hz,female 140–280 Hz),range(male 40–
80 Hz,female>80 Hz),
speaking rate (standard 175 words per min), volume (0.0–1.0,default 0.5)

voice default=(140,80,300,0.5)

The new VerySpeedyGonzales personality is created by inheriting for the SpeedyGonzales personality definition file (listed above). The keyword "extends" in the current listing denotes the "base-class" personality which attributes should be reused. In this embodiment, the new personality only overwrites the voice settings of the old personality. Thus, even though VerySpeedyGonzales speaks even faster then SpeedyGonzales, it otherwise behaves the same in terms of emotional response, the language of prompts it uses, etc.

Figure 2:
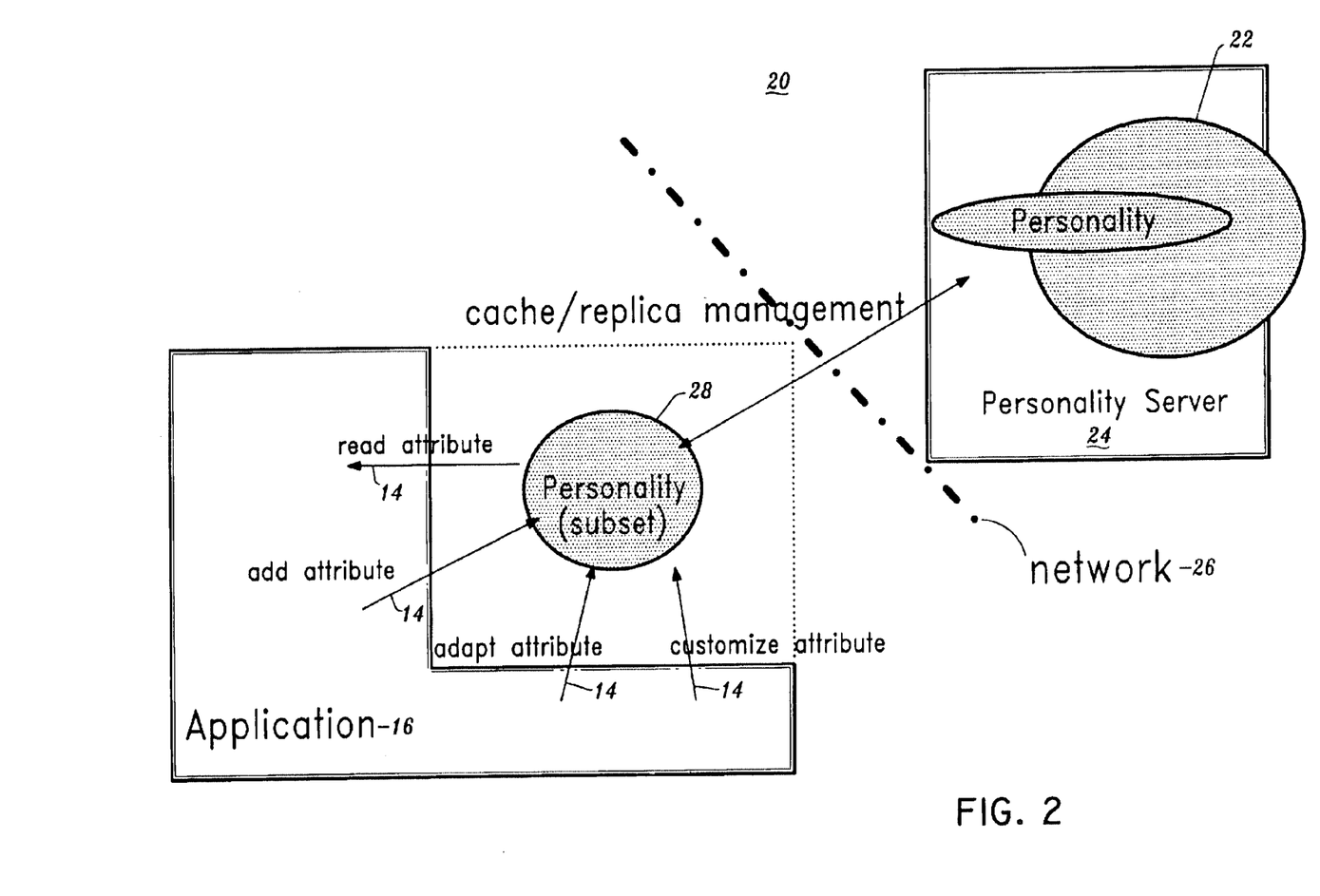
FIG. 2 is a schematic diagram showing a portion of a personality replicated locally by employing a personality server in accordance with the present invention.

Referring to FIG. 2, in one embodiment, to support broad availability, a complete personality profile 22 including all attributes can be stored in a system 20 (and regularly updated) at a dedicated server 24, i.e., a personality server. Applications 16 may then contact the personality server 24 over a network 26, for example, the Internet, a local area network, a wide area network, or the like and upon authentication download and cache a subset of the personality attributes 28 needed to perform a given task. This also allows for more convenient handling when the complete personality data are large and only a part is needed at a given time or for a particular application.

A speech-based conversation with the system contributes to the feeling that the user is actually interacting with an intelligent being. The system can accept that role and behave as a human being by maintaining a certain emotional state. Emotions, for example, happiness, loneliness, weariness, frustration, etc. increase the level of user-friendliness of the system by translating some characteristics of the system state into an emotional dimension, sometimes more conceivable by humans. As stated above, a collection of system emotions are considered as part of the personality of the system. The collection of emotions is an application-independent, non-adaptable property, customizable by the ordinary user.

Figure 3:
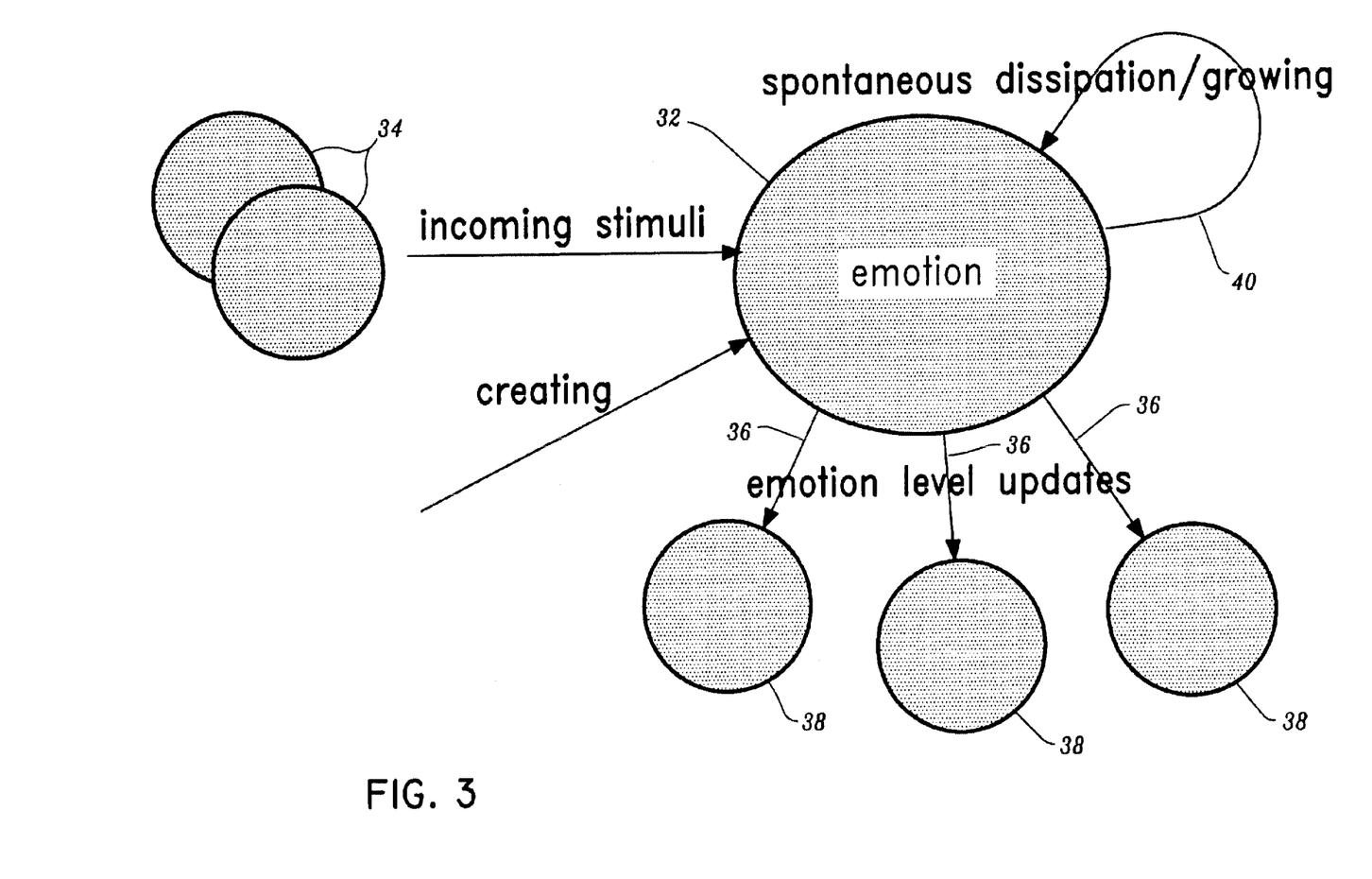
FIG. 3 is a schematic diagram of a emotion lifecycle in accordance with the present invention.

Referring to FIG. 3, every emotion 32 of one or more emotions is represented as a standalone entity that updates its state based on stimuli 34 from the outside world. Changes in the emotion state are passed via a notification mechanism 36 to components 38 subscribed for change notification. Two kinds of emotions are illustratively described here: dissipating and growing. The states of emotion dissipate or grow in accordance with criteria such as time, number of commands/tasks, or other conditions. These condition may be user stimulated or stimulated by internal stimuli 40. Dissipating emotions spontaneously decrease over time, and increase upon incoming stimuli. Growing emotions spontaneously increase the emotional level as time progresses, and decrease upon incoming stimuli. For both emotion groups, when the emotional level reaches the high or low watermarks (thresholds) a special notification is activated or fired.

For example, for the present invention, loneliness is implemented as a growing emotion. The level of loneliness increases every couple of seconds, and decreases by a certain level when the user issues a command. When the user does not use the system for a while, the loneliness level crosses the high watermark threshold and the system asks for attention. Loneliness then resets to its initial level. Other emotions, such as happiness, frustration and weariness, are implemented as dissipating emotions. Happiness decreases over time and when the system has high confidence in the commands issued by the user, its happiness grows. When the high watermark is reached, the system flatters the user. Frustration also decays over time as the system improves its mood. When the system has trouble understanding the commands, the frustration level increases, and when it reaches the high watermark, the system announces that it is depressed. Similar logic lies behind weariness. By decaying weariness level, the system recuperates over time. Every command issued increases the weariness level and at the point of reaching the high watermark the system complains that it is too tired. Other emotions and activation methods are contemplated and may be included in accordance with the present invention.

Figure 4:
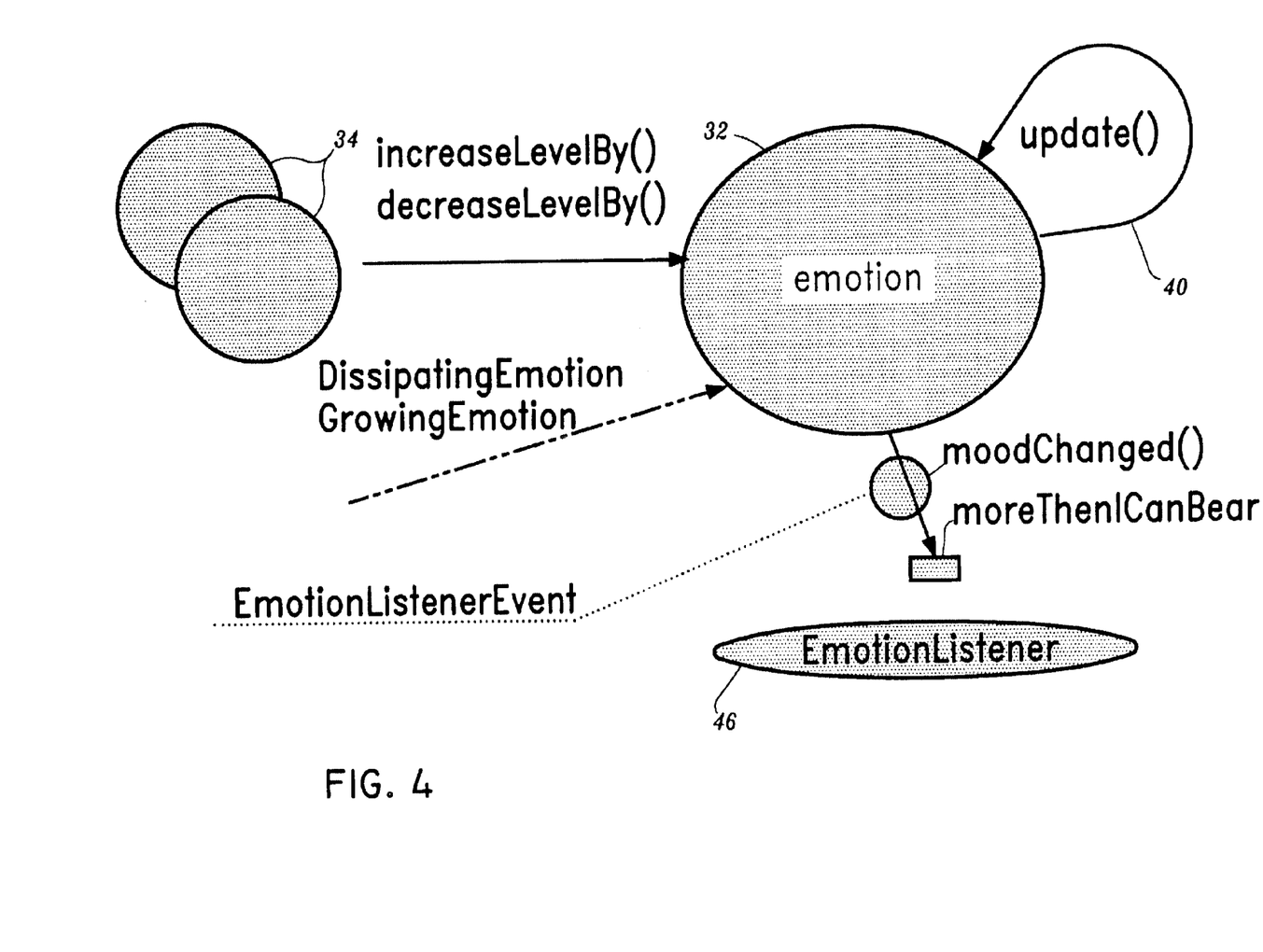
FIG. 4 is a schematic diagram showing an emotion handling and notification framework in accordance with the present invention.

Referring to FIG. 4, at the implementation level, two emotional groups discussed above are preferably implemented by a pair of illustrative Java classes—DissipatingEmotion and GrowingEmotion. These classes are subclasses of the emotion class which is an abstract class subclassing the java.lang.Thread class. The emotion class implements the basic emotional functionality and exposes the following methods as its public application program interface (API):

addEmotionListener(EmotionListener)

removeEmotionListener(EmotionListener)

This addEmotionListener( ) and removeEmotionListener( ) method pair allows other components 38 (FIG. 3) to subscribe/unsubscribe for notifications in the change of a given emotional level. The object passed as the parameter implements the EmotionListener interface. This interface is used for delivering status change notifications.

increaseLevelBy(double)

decreaseLevelBy(double)

These methods represent an incoming stimulus. Its level is illustratively quantized by the parameter of the double type and should fall within (0,1) interval. The value of the parameter is added/substracted to/from the current level of emotion and a state notification if fired to the subscribed components 38.

The present invention invokes the decreaseLevelBy( ) method for loneliness every time the user issues a command. A parameter for indicating emotional level may employ one of a collection of fuzzy quantifiers, for example, ALITTLE, SOMEWHAT, BUNCH, etc. The actual values of these quantifiers may be specified by a given personality. This arrangement permits each personality to control how much effect each stimulus has on a given emotion and thus model the emotional profile of the personality (e.g., jumpy versus calm personality, etc.)

setLevel(double)

The setLevel( ) method illustratively takes the parameter of the double type. Invoking this method causes the current level to be reset to the new value specified.

getLevel( )

The getLevel( ) returns the actual value of a given emotional level.

setThreshold(double)

The call of this method causes the high watermark level to be reset to the level specified by the double argument.

getThreshold( )

The getThreshold( ) method returns the value of the high watermark for a given emotion.

The following methods are not part of the public API of the emotion class. The following methods are inaccessible from outside but can be modified by subclasses. The methods implement the internal logic of emotion handling.

fireOnchange( )

When the emotion level changes, the fireOnChange( ) method ensures all subscribers (that previously called addEmotionListener()) are notified of the change by invoking the moodChanged( ) method on the EmotionListener interface.

fireOnThresholdIfNeeded( )

The fireOnThresholdIfNeeded( ) method goes over the list of components subscribed for receiving notifications and invokes the moreThanICanBear( ) method on their EmotionListener interface. It then resets the current emotion level to the initial level and resets the elapsed time count to zero.

update( )

This method has an empty body and is declared as abstract in the emotion class. Update( ) is preferably implemented by subclasses and it controls how often and how much the emotion level spontaneously dissipates/grows over time.

The emotion class is subclassed by two classes, DissipatingEmotion and GrowingEmotion, already described above. Each provides a specific implementation of the update( ) methods.

For the DissipatingEmotion class, the update( ) method ensures the emotion level spontaneously decreases over time. The speed and amount of decrease is specified at the time when the class is instantiated. A simple decaying function may be used, where alpha ($\alpha$) is a decay constant.

The update( ) method in the GrowingEmotion class is used to increase the emotion level by amount and at a pace specified at the time of instantiation. The inverse decaying function is used in this case, however functions may also be employed. The constructors for both classes look similar:

DissipatingEmotion(tick, startingEmotionLevel, threshold, alpha)

GrowingEmotion(tick, startingEmotionLevel, threshold, alpha)

The first parameter, tick, specifies how often the update( ) method should be called, i.e. how frequently the emotion spontaneously changes. The second parameter, startingEmotionLevel, specifies the initial emotion level. The third parameter, alpha, determines the level of the high watermark. The alpha value specifies how much the emotion level changes when the update( ) method is called. As already stated above, the components 38 interested in receiving emotion state notifications have to implement the EmotionListener interface 46. This interface defines two methods:

moodChanged(EmotionListenerEvent)

moreThanICanBear(EmotionListenerEvent)

MoodChanged(EmotionListenerEvent) is called every time an emotion changes its state. MoreThanICanBear (EmotionListenerEvent) is called when the watermark threshold is reached. The EmotionListenerEvent object passed as the parameter describes the emotion state reached in more detailed terms, specifying the value reached, the watermark, the associated alpha, the elapsed time from the last reset, and the total time of how long is the emotion alive.

Growing emotions increase with time and decrease on incoming stimuli. Suppose a given emotion level is denoted by x(t), where t is the time elapsed since the last stimuli, $\alpha$ is the time constant, and $\Delta t$ denotes the update interval. In one embodiment, the growing emotions grow as follows (in the absence of external stimuli)

$$x(t) = 1 - \{1 - x(t - \Delta t)\}\left(\frac{t}{t + \Delta t}\right)^a, \quad t > 0$$

For t=0, x(0) is the starting emotion level. The above is one way to grow the emotions. Any other growing function may also be used.

Dissipating emotions decrease with time and increase on incoming stimuli. Using x(t) to denote the emotion level at time t, where t is the time elapsed since the last stimuli, $\alpha$ is the time constant and $\Delta t$ denotes the update interval, in one embodiment, the emotions dissipate as follows (in the absence of external stimuli)

$$x(t) = \{x(t - \Delta t)\}\left(\frac{t}{t + \Delta t}\right)^a, \quad t > 0$$

For t=0, x(0) is the starting emotion level. The above is one way to dissipate the emotions. Any other dissipating function may also be used.

Examples of other emotions may include the following:

| | |
|---|---|
| Anger | increases when system prompts the user with a question, but the user says something irrelevant to the questions, or issues a different command. |
| Impatience | increases when the user takes a long time to response to a system prompt |
| Jealousy | increases when the user ignores the conversational assistant but works with other applications on the same computer. |

Other emotions may also be employed in accordance with the invention.

System initiative may be generated by emotions. Certain emotions exhibited by the present invention can be used as a vehicle for generating system initiative. For example, the loneliness emotion described above allows the system to take the initiative after a certain period of the user's inactivity. Also, reaching a high level of frustration may compel the system to take initiative and narrow the conversation to a directed dialog to guide the confused user. The present invention employs personality and emotion to affect the presentation of information to the user. Personality specifies the grammar used for generating prompts and, for example, permits the use of shorter (experienced users) or longer (coaching mode) prompts as needed. The emotional status of an application can be also used to modify the prompts and even the behavior of the system.

Figure 5:
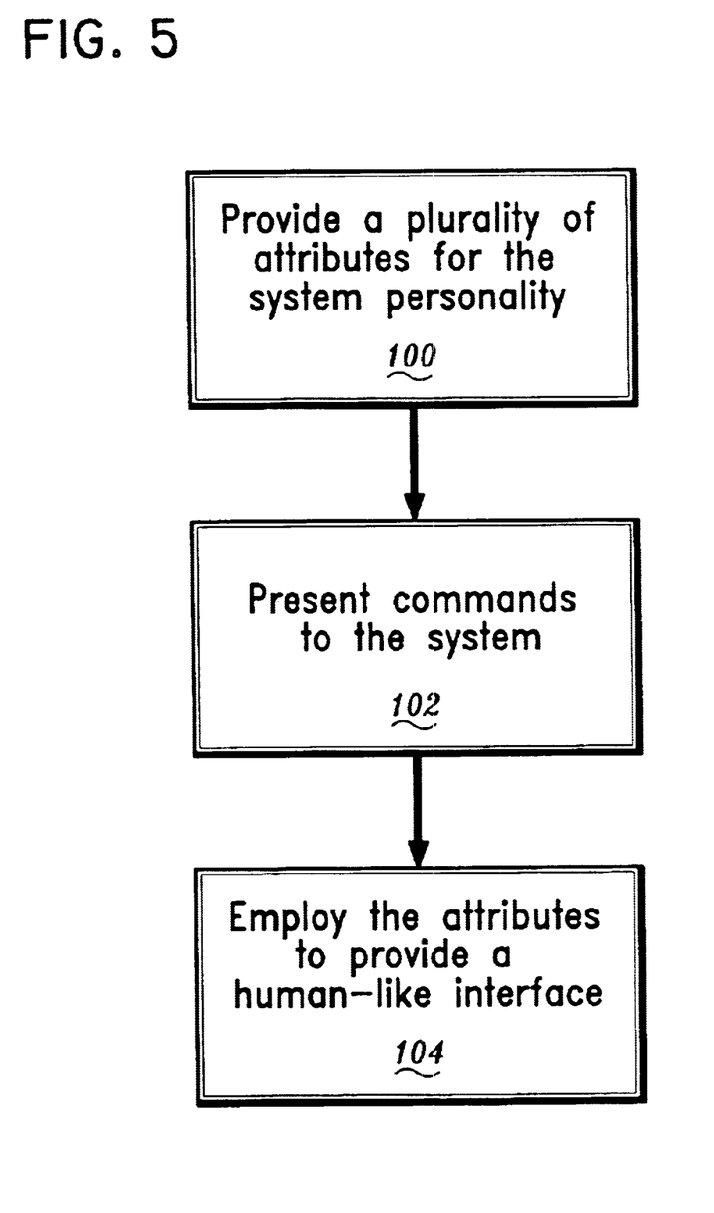
FIG. 5 is a block/flow diagram of a system/method for providing a personality for a computer system in accordance with the present invention.

Referring to FIG. 5, a system/method, in accordance with the present invention, is shown for providing a personality for a conversational system. The invention may be implemented by a program storage device readable by machine, tangibly embodying a program of instructions executable by the machine. In block 100, a plurality of attributes are provided for determining a behavior of the conversational system. The attributes may include a manner of presenting information to the user. The attributes may further include language characteristics, grammar, speech models, vocabulary, emotions, sense of humor and learning ability. The attributes may be selectable by the user, customized by the user, and/or adaptable by the system for a particular user or users based on interaction between the user and the conversational system. The attributes may be application dependent attributes, i.e., depend on the application being employed. In block 102, when a command is presented to the conversational system for execution, the command is responded to by employing the plurality of attributes such that the user experiences an interface with human characteristics, in block 104. The response to the command by employing the plurality of attributes may include adapting prediction models based on user interaction to customize and adapt the attributes in accordance with user preferences.

Figure 6:
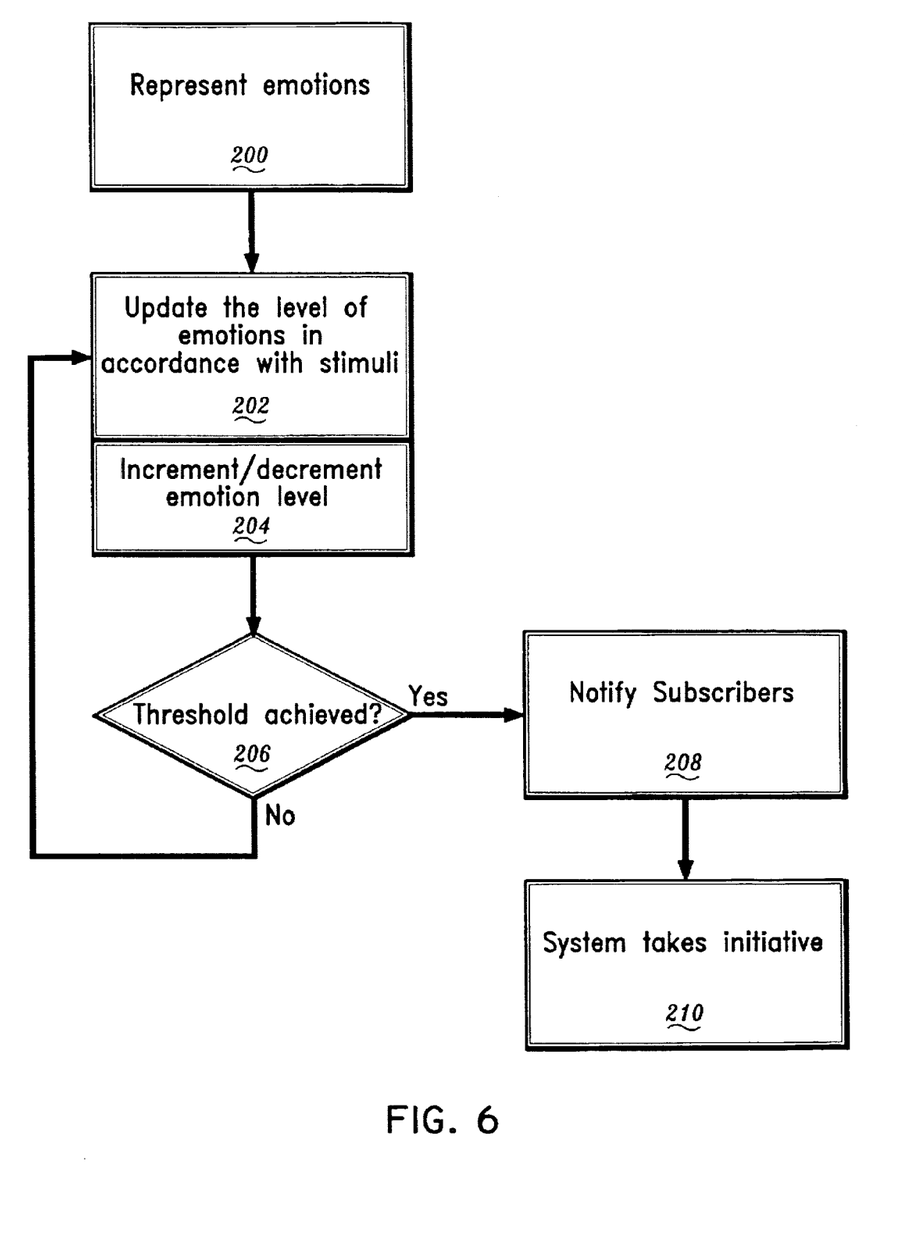
FIG. 6 is a block/flow diagram of a system/method for providing emotions for a computer system in accordance with the present invention.

Referring to FIG. 6, a method/system for providing emotions for a conversational system is described, in accordance with the present invention. The method/system may be implemented by employing a program storage device readable by machine, tangibly embodying a program of instructions executable by the machine. In block 200, each of a plurality of emotions are represented as an entity. The entity may be a software entity such as an object or a hardware entity such as a memory location or device, e.g., a cache or register. In block 202, a level of each emotion is updated responsive either to user stimuli or internal stimuli or both. The emotions may preferably include growing emotions and dissipating emotions, and may include happiness, frustration, loneliness and weariness. The user stimuli may include a type, a quantity and a rate of commands given to the conversational system. The internal stimuli may include an elapsed time and time between user interactions.

The level of emotions may be incremented/decremented by an assignable amount based on interaction events with the user, in block 204. When a threshold level is achieved for each emotion in block 206, the user stimuli and internal stimuli are reacted to by notifying components subscribing to each emotion to take appropriate action in block 208. In block 210, an initiative by the conversational system may be generated in accordance with achieving a threshold level for the level of emotions may be included. The threshold level may be selected by the user.

To illustrate the present invention a dialog with mixed initiative (with two different personalities) is presented. The following example lists a part of a system-user dialog to illustrate how using two different personalities affects the prompts used by the system. In the example, U is an abbreviation of user and S stands for the conversational system. Responses from both personalities are provided at the same time for sake of comparison, the first personality in the normal font, the other in italics. The personalities may also include different voice characteristics (male, female, etc.), and different emotional models (these are not explicitly shown in example 3 below).

An Illustrative Dialog, Example 3:
1. U: Put all the messages from Jeff about proposal into a folder called proposal.
2. S: I found no messages from Jeff. Do you want to select someone else?
(2a. S: Nothing from Jeff.)
3. U: I meant Jeffrey.
4. S: Do you mean Jeffrey Smith or Jeffrey Houston?<disambiguation>
(4a. S: Jeffrey Smith or Jeffrey Houston?)
5. S: Excuse me, you have one new message. <system initiative to announce new message>
(Note: some system personalities do not take initiative. This may change the discourse behavior.)
6. U: Who is it from?
7. S: The author of the message is Susan McKay.
(7a. S: Susan McKay)
8. U: What's the subject?
9. S: The subject is let's move the meeting on September 12th to afternoon around 3 P.M.
(9a. S: let's move the meeting on September 12th to afternoon around 3 P.M.)
10. U: What day is September 12th?
11. S: That is a Friday.
(11a. S: Friday.)
12. U: Find the meeting with Susan on that day.
13. U: Move the meeting to 3 o'clock
14. U: Close this. <system closes calendar entry>
15. U: Close this. <system minimizes calendar>
16. U: I mean Jeffrey Houston. <user tries to finish the previous discourse>
17. S: The folder called proposal does not exist. Would you like me to create it?
(17a. S: No folder proposal. Create it?)
18. U: Yes I would.
19. S: This may take a few seconds.
(19a. S: Processing.)
20. S: Transfer is done.
(20a. S: Done.)

Having described preferred embodiments of a personality generator for conversational systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for providing a personality for a conversational system, comprising the steps of:
   providing a personality comprising a plurality of attributes for determining a behavior of the conversational system, wherein the attributes comprise attributes for specifying one or more emotions associated with the personality, wherein the emotions comprise one of a growing emotion, a dissipating emotion and both;
   presenting a command to the conversational system for execution; and
   responding to the command by employing the plurality of attributes such that the user experiences an interface with human characteristics, wherein an emotional level of a growing emotion increases as a function of time and decreases upon user stimuli and wherein an emotional level of a dissipating emotion decreases as a function of time and increases upon user stimuli.

2. The method as recited in claim 1, wherein the attributes include a manner of presenting information to the user.

3. The method as recited in claim 2, wherein the manner of presenting information to the user includes employing voices defined by specifying pitch, range, speaking rate and volume.

4. The method as recited in claim 1, wherein the attributes include language characteristics, grammar, speech models, vocabulary, emotions, sense of humor and learning ability.

5. The method as recited in claim 1, wherein the attributes are selectable by the user.

6. The method as recited in claim 1, wherein the attributes include user customized attributes.

7. The method as recited in claim 1, wherein the attributes are adaptable based on interaction between the user and the conversational system.

8. The method as recited in claim 1, wherein the attributes include application dependent attributes.

9. The method as recited in claim 1, wherein the step of responding to the command by employing the plurality of attributes includes the step of adapting the attributes in accordance with user preferences.

10. The method of claim 1, further comprising the steps of:
- activating an emotion when a corresponding emotional level reaches a threshold; and
- resetting the emotional level to predetermined initial level.

11. A program storage device readable by machine, tangibly embodying a program of instructions executable by the machine to perform method steps for providing a personality for a conversational system, the method steps comprising:
- providing a personality comprising a plurality of attributes for determining a behavior of the conversational system, wherein the attributes comprise attributes for specifying one or more emotions associated with the personality, wherein the emotions comprise one of a growing emotion, a dissipating emotion and both;
- presenting a command to the conversational system for execution; and
- responding to the command by employing the plurality of attributes such that the user experiences an interface with human characteristics, wherein an emotional level of a growing emotion increases as a function of time and decreases upon user stimuli and wherein an emotional level of a dissipating emotion decreases as a function of time and increases upon user stimuli.

12. The program storage device as recited in claim 11, wherein the attributes include a manner of presenting information to the user.

13. The program storage device as recited in claim 12, wherein the manner of presenting information to the user includes employing voices defined by specifying pitch, range, speaking rate and volume.

14. The program storage device as recited in claim 11, wherein the manner of presenting information to the user includes employing voices defined by specifying pitch, range, speaking rate and volume.

15. The program storage device as recited in claim 11, wherein the attributes include language characteristics, grammar, speech models, vocabulary, emotions, sense of humor and learning ability.

16. The program storage device as recited in claim 11, wherein the attributes are selectable by the user.

17. The program storage device as recited in claim 11, wherein the attributes include user customized attributes.

18. The program storage device as recited in claim 11, wherein the attributes are adaptable based on interaction between the user and the conversational system.

19. The program storage device as recited in claim 11, wherein the attributes include application dependent attributes.

20. The program storage device as recited in claim 11, wherein the step of responding to the command by employing the plurality of attributes includes the step of adapting the attributes in accordance with user preferences.

21. The program storage device of claim 11, further comprising instructions for performing the steps of:
- activating an emotion when a corresponding emotional level reaches a threshold; and
- resetting the emotional level to predetermined initial level.

22. A program storage device readable by machine, tangibly embodying a program of instructions executable by the machine to perform method steps for providing a conversational user interface with personality, the method steps comprising:
- executing an application comprising a personality, the personality comprising a plurality of attributes for specifying a behavior of the conversational user interface, the attributes comprising attributes for specifying one or more emotions associated with the personality, wherein the emotions comprise one of a growing emotion, a dissipating emotion and both; and
- responding to user commands by employing the plurality of attributes such that the user experiences a user interface with human characteristics, wherein an emotional level of a growing emotion increases as a function of time and decreases upon user stimuli and wherein an emotional level of a dissipating emotion decreases as a function of time and increases upon user stimuli.

23. The program storage device of claim 22, further comprising instructions for performing the steps of:
- activating an emotion when a corresponding emotional level reaches a threshold; and
- resetting the emotional level to predetermined initial level.

\* \* \* \* \*